US012152214B2

(12) United States Patent
Yoshizaki et al.

(10) Patent No.: US 12,152,214 B2
(45) Date of Patent: Nov. 26, 2024

(54) GREASE COMPOSITION AND ROLLING BEARING

(71) Applicants: JTEKT CORPORATION, Aichi (JP); ENEOS Corporation, Tokyo (JP)

(72) Inventors: Koji Yoshizaki, Osaka (JP); Kazunori Miyake, Nara (JP); Kazumi Sakai, Kanagawa (JP); Yusuke Ayame, Kanagawa (JP); Kiyomi Sakamoto, Kanagawa (JP)

(73) Assignees: JTEKT CORPORATION, Aichi (JP); ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/928,054

(22) PCT Filed: Apr. 7, 2021

(86) PCT No.: PCT/JP2021/014735
§ 371 (c)(1),
(2) Date: Nov. 28, 2022

(87) PCT Pub. No.: WO2021/246049
PCT Pub. Date: Dec. 9, 2021

(65) Prior Publication Data
US 2023/0212474 A1 Jul. 6, 2023

(30) Foreign Application Priority Data
Jun. 5, 2020 (JP) .................................. 2020-098174

(51) Int. Cl.
| | | |
|---|---|---|
| *C10M 107/02* | (2006.01) | |
| *C10M 115/08* | (2006.01) | |
| *C10M 135/10* | (2006.01) | |
| *C10M 137/10* | (2006.01) | |
| *C10M 169/06* | (2006.01) | |
| *F16C 19/38* | (2006.01) | |
| *F16C 33/66* | (2006.01) | |
| *C10N 10/04* | (2006.01) | |
| *C10N 10/12* | (2006.01) | |
| *C10N 20/02* | (2006.01) | |
| *C10N 40/02* | (2006.01) | |
| *C10N 50/10* | (2006.01) | |

(52) U.S. Cl.
CPC ........ *C10M 107/02* (2013.01); *C10M 115/08* (2013.01); *C10M 135/10* (2013.01); *C10M 137/10* (2013.01); *C10M 169/06* (2013.01); *F16C 19/38* (2013.01); *F16C 33/66* (2013.01); C10M 2205/0206 (2013.01); C10M 2215/1026 (2013.01); C10M 2219/044 (2013.01); C10M 2223/045 (2013.01); C10N 2010/04 (2013.01); C10N 2010/12 (2013.01); C10N 2020/02 (2013.01); C10N 2040/02 (2013.01); C10N 2050/10 (2013.01)

(58) Field of Classification Search
CPC ............ C10N 2020/02; C10N 2010/04; C10N 2030/06; C10N 2010/12; C10N 2050/10; C10N 2030/76; C10N 2040/02; F16C 33/6688; F16C 33/66; F16C 19/38; F16C 33/6633; F16C 19/383
See application file for complete search history.

(56) References Cited

U.S. PATENT DOCUMENTS

| | | | |
|---|---|---|---|
| 2003/0040442 A1 | 2/2003 | Yokouchi et al. | |
| 2007/0179066 A1* | 8/2007 | Sakamoto ............ | C10M 169/02 508/113 |
| 2016/0208856 A1 | 7/2016 | Iino et al. | |
| 2017/0002867 A1 | 1/2017 | Iino et al. | |
| 2018/0298304 A1 | 10/2018 | Yoshizaki et al. | |

FOREIGN PATENT DOCUMENTS

| | | |
|---|---|---|
| CN | 105802716 A | 7/2016 |
| CN | 109321333 A | 2/2019 |
| EP | 1 570 034 B1 | 2/2016 |
| JP | 2006-071104 A | 3/2006 |
| JP | 2013-124323 A | 6/2013 |
| JP | 2017-002306 A | 1/2017 |

OTHER PUBLICATIONS

Office Action issued in CN Patent Application No. 202180040398. X, Jun. 1, 2023, translation.
ISR issued in INTERNATIONAL Patent Application No. PCT/JP2021/014735, Jun. 8, 2021, translation.
IPRP issued in INTERNATIONAL Patent Application No. PCT/JP2021/014735, Dec. 6, 2022, translation.
Office Action issued in DE Patent Application No. 11 2021 003 139.2, Apr. 20, 2023, translation.
Office Action dated Nov. 29, 2023, issued in Chinese patent application No. 202180040398.X, with English translation thereof.
Decision of Rejection issued Mar. 28, 2024 in Chinese patent application No. 202180040398.X, with English translation thereof.

\* cited by examiner

*Primary Examiner* — Vishal V Vasisth
(74) *Attorney, Agent, or Firm* — GREENBLUM & BERNSTEIN, P.L.C.

(57) ABSTRACT

There is provided a grease composition for improving the chemical stability of the grease composition and increasing the fatigue life of a member in which the grease composition is used. The problems can be solved by a grease composition including a poly-α-olefin; a urea-based thickener; molybdenum dithiophosphate; and barium sulfonate, wherein a difference between an SP value of the urea-based thickener and an SP value of the poly-α-olefin is 3.5 or less.

2 Claims, 1 Drawing Sheet

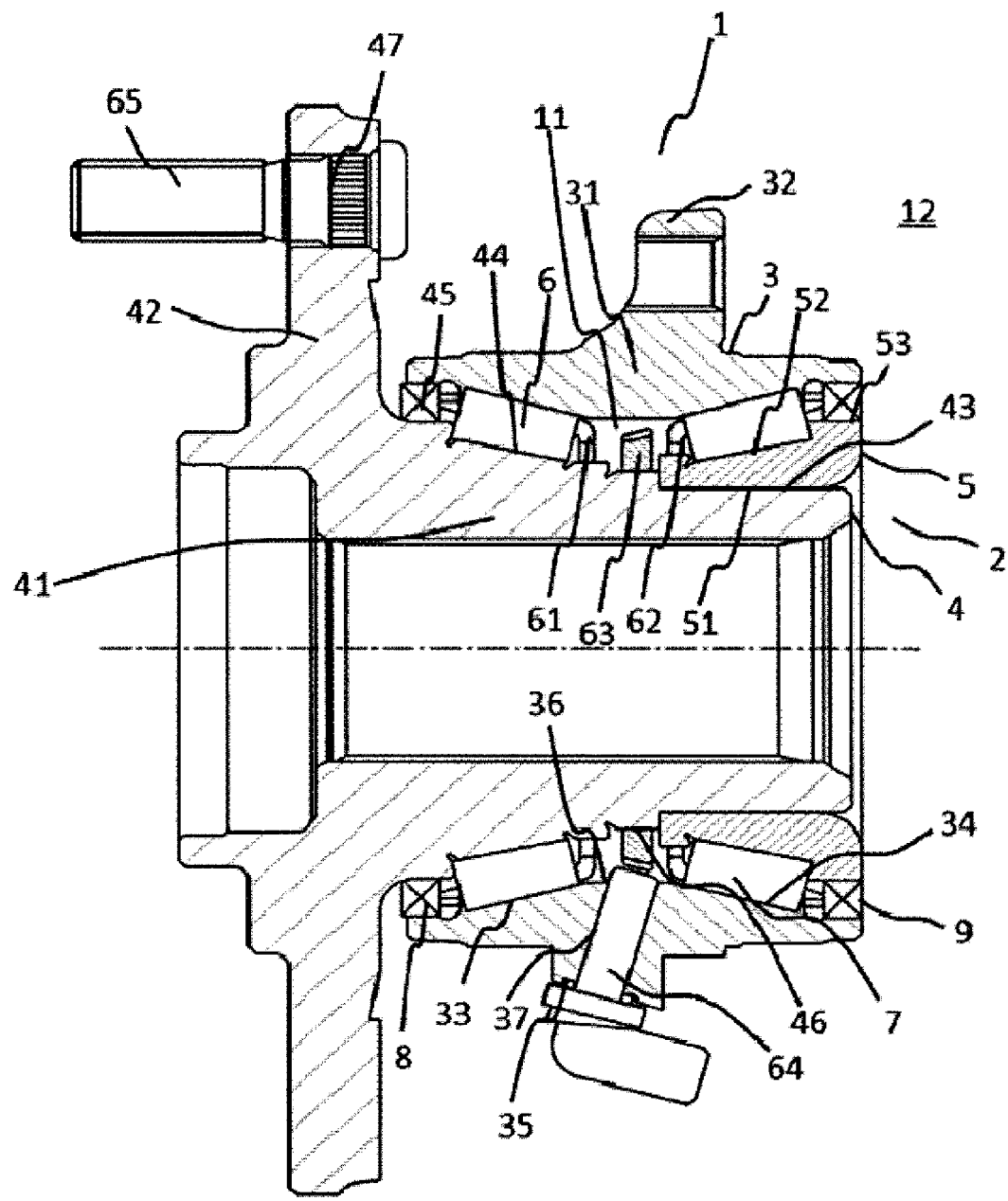

GREASE COMPOSITION AND ROLLING BEARING

This application is a 371 of PCT/JP2021/014735, filed Apr. 7, 2021.

TECHNICAL FIELD

The present invention relates to a grease composition. The present invention also relates to a rolling bearing in which a grease composition is sealed.

This application claims priority to Japanese Patent Application No. 2020-98174 filed on Jun. 5, 2020, the entire disclosure of which is incorporated herein.

BACKGROUND ART

Greases are mainly used in sliding bearings, rolling bearings, or sliding portions where it is difficult to maintain a film of a lubricant in an adhered state because the contact surfaces move. The grease is selected according to its use conditions. For example, under high temperature and high load, usually, a grease including a base oil having a kinematic viscosity of about 70 $mm^2/s$ to 100 $mm^2/s$ at 40° C. is used. By using such a grease, the seizure of a bearing can be prevented, and the lubricity of the bearing can be maintained for a long period.

On the other hand, as in Patent Literature 1, a grease is also proposed in which a base oil having a kinematic viscosity of about 70 $mm^2/s$ to 100 $mm^2/s$ at 40° C., a urea-based thickener having a particular composition, and a plurality of particular additives. It maintains the lubricity of the grease for a long period and improves the low temperature fretting properties.

CITATION LIST

Patent Literature

Patent Literature 1: Japanese Patent Laid-Open No. 2017-2306

SUMMARY OF INVENTION

Technical Problem

As proposed in Patent Literature 1, by combining a urea-based thickener with particular additives and a base oil, low temperature fretting properties can be improved while lubricity is maintained. However, when such a grease is used in high temperature and high load conditions for a long period, the chemical stability of the thickener may be impaired, and therefore impurities and the like may be generated. In addition, a problem has occurred that due to the generated impurities, an abnormal sound is generated inside the bearing, and the torque of the bearing becomes unstable, and thus the product performance is deteriorated. Further, such a grease may shorten the fatigue life of a rolling bearing or the like in which the grease is sealed.

Solution to Problem

The present inventors have diligently studied the improvement of the chemical stability of a grease composition using a urea-based thickener. As a result, the present inventors have discovered that the chemical stability of the grease composition improves as the difference between the Solubility Parameters (hereinafter referred to as "SP values") of the base oil and the thickener becomes smaller. Further, the present inventors have also maintain for a long period the fatigue life of a rolling bearing or the like in which the grease is sealed, by blending particular additives in combination with other components considering the SP values. Therefore, the present inventors have found that the problems can be solved and completed the invention.

The present invention has been made based on such findings and is as follows.

<1> A grease composition including:
  a poly-α-olefin;
  a urea-based thickener;
  molybdenum dithiophosphate; and
  barium sulfonate, wherein
a difference between an SP value of the urea-based thickener and an SP value of the poly-α-olefin is 3.5 or less.

<2> The grease composition according to <1>, wherein the urea-based thickener is a urea-based thickener in which a ratio of an amount of an aliphatic amine to a total amount of an alicyclic amine and the aliphatic amine {amount of aliphatic amine:(total amount of alicyclic amine and aliphatic amine)} is 5:100 to 35:100 in molar ratio, and
  a kinematic viscosity of the poly-α-olefin at 40° C. is 20 $mm^2/s$ to 40 $mm^2/s$.

<3> The grease composition according to <1> or <2>, wherein
  a content of the poly-α-olefin is 75% by mass to 85% by mass based on the grease composition,
  a content of the urea-based thickener is 8% by mass to 20% by mass based on the grease composition,
  a content of the molybdenum dithiophosphate is 0.05% by mass to 1.5% by mass based on the grease composition, and
  a content of the barium sulfonate is 0.05% by mass to 1.5% by mass based on the grease composition.

<4> A rolling bearing including:
  an inner raceway member;
  an outer raceway member;
  a plurality of rolling elements rollably disposed between a raceway of the inner raceway member and a raceway of the outer raceway member;
  two seals hermetically sealing an internal space between the inner raceway member and the outer raceway member against an external space; and
  the grease composition according to any of <1> to <3> sealed in the internal space.

Advantageous Effects of Invention

The grease composition of the present invention is excellent in chemical stability, and further the fatigue life of a rolling bearing or the like in which the grease is sealed can also be maintained for a long period. Therefore, the grease composition of the present invention can withstand long-term use.

BRIEF DESCRIPTION OF DRAWING

FIG. 1 is a cross-sectional view showing a wheel bearing (rolling bearing) according to one embodiment of the present invention.

DESCRIPTION OF EMBODIMENTS

[Base Oil]

In the grease composition of the present invention, as the base oil, a poly-α-olefin can be used. The kinematic viscosity of the poly-α-olefin at 40° C. is preferably 20 mm²/s to 40 mm²/s, further preferably 22 mm²/s to 40 mm²/s.

The kinematic viscosity at 40° C. can be measured in accordance with JIS K 2283: 2000.

Examples of the poly-α-olefin typically include oligomers or cooligomers of α-olefins having 2-32, preferably 6-16, carbon atoms (1-octene oligomers, decene oligomers, ethylene-propylene cooligomers, and the like) and hydrides thereof. "Having 2-32 carbon atoms" means having 2 to 32 carbons.

The content of the base oil in the grease composition of the present invention is preferably 75% by mass to 85% by mass based on the total amount of the grease composition.

The grease composition of the present invention preferably includes only the poly-α-olefin as the base oil and includes no other base oils. Specifically, in the grease composition of the present invention, the content of the poly-α-olefin can be, for example, 50% by mass or more, 60% by mass or more, 70% by mass or more, 80% by mass or more, 90% by mass or more, 95% by mass or more, or 99% by mass or more based on the base oil.

[Urea-Based Thickener]

As the urea-based thickener, a urea-based compound obtained by reacting a mixed amine of an alicyclic amine and an aliphatic amine with a diisocyanate compound can be used. Examples of the urea-based thickener include urea compounds such as diurea compounds, triurea compounds, tetraurea compounds, and polyurea compounds (excluding diurea compounds, triurea compounds, and tetraurea compounds), urea-urethane compounds, urethane compounds such as diurethanes, or mixtures thereof. Among these, preferably, diurea compounds are used.

Examples of the alicyclic amine include cyclohexylamine and dicyclohexylamine. Examples of the aliphatic amine include octadecylamine.

Examples of the diisocyanate compound include aliphatic diisocyanates, alicyclic diisocyanates, and aromatic diisocyanates. Examples of the aliphatic diisocyanates include diisocyanates having saturated and/or unsaturated linear or branched hydrocarbon groups. Specific examples include methylene diisocyanate, octadecane diisocyanate, decane diisocyanate, and hexane diisocyanate (HDI). Examples of the alicyclic diisocyanates include cyclohexyl diisocyanate and dicyclohexylmethane diisocyanate. Examples of the aromatic diisocyanates include phenylene diisocyanate, tolylene diisocyanate (TDI), diphenyl diisocyanate, and diphenylmethane diisocyanate (MDI).

[Ratio of Amount of Aliphatic Amine to Total Amount of Alicyclic Amine and Aliphatic Amine]

In the urea-based thickener included in the grease composition of the present invention, the ratio of the amount of the aliphatic amine to the total amount of the alicyclic amine and the aliphatic amine {amount of aliphatic amine:(total amount of alicyclic amine and aliphatic amine)} is preferably 5:100 to 35:100, more preferably 10:100 to 35:100, further preferably 15:100 to 35:100, and most preferably 18:100 to 35:100 in molar ratio. As used herein, when "5:100 to 35:100" is described, the values at both ends, that is "5:100" and "35:100", are included within the range.

The grease composition of the present invention preferably includes only a urea-based thickener obtained by reacting a mixed amine of an alicyclic amine and an aliphatic amine with a diisocyanate compound, as the urea-based thickener, and includes no other urea-based thickeners. Specifically, in the grease composition of the present invention, the content of the urea-based thickener obtained by reacting the mixed amine of the alicyclic amine and the aliphatic amine with the diisocyanate compound can be, for example, 50% by mass or more, 60% by mass or more, 70% by mass or more, 80% by mass or more, 90% by mass or more, 95% by mass or more, or 99% by mass or more based on the urea-based thickener.

The mixed amine of the alicyclic amine and the aliphatic amine and the diisocyanate compound can be reacted by various methods and under various conditions. They are preferably reacted in the base oil to obtain a diurea compound in which the uniform dispersibility of the thickener is high. The reaction may be performed by adding the base oil in which the diisocyanate compound is dissolved into the base oil in which the mixed amine is dissolved, or by adding the base oil in which the mixed amine is dissolved into the base oil in which the diisocyanate compound is dissolved. The temperature and time in these reactions are not particularly limited and may be temperature and time similar to those of the usual reactions of this type. The reaction temperature is preferably 60° C. to 170° C. in terms of the solubility and volatility of the mixed amine and the diisocyanate. The reaction time is preferably 0.5 h to 2.0 h in terms of completing the reaction of the mixed amine with the diisocyanate and in terms of enhancing efficiency by production time reduction.

The content of the urea-based thickener obtained by reacting the mixed amine of the alicyclic amine and the aliphatic amine with the diisocyanate compound is preferably 8% by mass to 20% by mass based on the total amount of the grease composition.

[SP Value]

As used herein, an "SP value" means a Solubility Parameter. Methods for estimating SP values include methods for estimating SP values from physical property values (a method for obtaining an SP value from the latent heat of vaporization, and a method by surface tension) and methods for estimating SP values from molecular structures (Fedors' calculation method, Hansen's calculation method, Hoy's calculation method, and the like). In the grease composition of the present invention, the SP values of the base oil and the urea-based thickener are calculated based on Fedors' calculation method. A method for calculating an SP value by Fedors' calculation method is described in detail in "Study on Solubility Parameter of Paint Additives" Ueda et al., Research on Coatings No. 152 October 2010.

In Fedors' calculation method, it is considered that both cohesive energy density and molar molecular volume depend on the type and number of substituents. In Fedors' calculation method, the following formula (A) and the constants shown in Table 1 are used for the measurement of an SP value σ.

$$\sigma(\text{cal/cm}^3) = [\Sigma E\text{coh (cal/mol)}/\Sigma V \text{ (cm}^3/\text{mol)}]^{1/2} \quad \text{Formula (A)}$$

TABLE 1

|  | >C< | >CH— | —CH2— | CH3 | —O— | —COO | =C=O | >C= | —CH= |
|---|---|---|---|---|---|---|---|---|---|
| Ecoh (cal) (cal/mol) | 350 | 820 | 1180 | 1125 | 800 | 4300 | 4150 | 1030 | 1030 |
| Ecoh (J) (J/mol) | 1470 | 3430 | 4940 | 4710 | 3350 | 18000 | 18000 | 4310 | 4310 |
| mol molecular volume (V) (cm3/mol) | −19.2 | −1.0 | 16.1 | 33.5 | 3.8 | 18.0 | 10.8 | −5.5 | 13.5 |
|  | CH2= | Phenyl (1) | Phenyl (2) | Phenyl (3) | Phenyl (4) | Phenyl (5) | Phenyl (6) | —CONH | —N= |
| Ecoh (cal) (cal/mol) | 1030 | 7630 | 7630 | 7630 | 7630 | 7630 | 7630 | 8000 | 2800 |
| Ecoh (J) (J/mol) | 4310 | 32050 | 32050 | 32050 | 32050 | 32050 | 32050 | 33600 | 11800 |
| mol molecular volume (V) (cm3/mol) | 28.5 | 71.4 | 52.4 | 33.4 | 14.4 | −4.6 | −23.6 | 9.5 | 5.0 |
|  | =NH | PO4 | PO3 | >CF— | —CF2— | —CF3 | —F(1) | —F(2) | —F(3) |
| Ecoh (cal) (cal/mol) | 2000 | 5000 | 3400 | 1000 | 1020 | 1020 | 1000 | 850 | 550 |
| Ecoh (J) (J/mol) | 8380 | 20950 | 14280 | 4190 | 4270 | 4270 | 4190 | 3560 | 2300 |
| mol molecular volume (V) (cm3/mol) | 4.5 | 28.0 | 22.7 | 18.0 | 23.0 | 57.5 | 18.0 | 20.0 | 22.0 |
|  | —Cl (1) | —Cl (2) |
| Ecoh (cal) (cal/mol) | 2760 | 2300 |
| Ecoh (J) (J/mol) | 11500 | 9630 |
| mol molecular volume (V) (cm3/mol) | 24.0 | 26.0 |

For example, in the case of a poly-α-olefin having one >CH— structure, eight -CH2- structures, and one CH3- structure, ΣEcoh (cal/mol) is about 10385, and ΣV (cm³/mol) is about 161.3. Therefore, [ΣEcoh (cal/mol)/ΣV (cm³/mol)]$^{1/2}$≈8.40 (cal/cm³) can be calculated. The SP value of the urea-based thickener can also be calculated by a similar method. Since the grease composition of the present invention includes a plurality of types of urea-based thickeners, that is, a urea-based thickener obtained by reacting a mixed amine of an alicyclic amine and an aliphatic amine with a diisocyanate compound, the SP value of the urea-based thickener is calculated based on the molar ratio between the alicyclic amine and the aliphatic amine. The SP value of the urea-based thickener is slightly corrected considering the combination of ureas thought to be probabilistically produced. That is, when two or more amines are used as the thickener, a urea-based compound in which different amine species are respectively added to both arms (NCO—) of a diisocyanate is produced with a certain probability when the amines are reacted with the diisocyanate. For example, when octadecylamine and cyclohexylamine are reacted with methylene diisocyanate, a urea-based compound in which octadecylamine and cyclohexylamine are respectively bonded to both arms of the diisocyanate is produced. Based on this production probability, the SP value of the urea-based thickener is slightly corrected.

SP values are defined by chemical structures, and therefore it is considered that as the difference between respective SP values becomes smaller, the affinity becomes higher. Therefore, it is considered that when the difference between the SP values of the base oil and the thickener is small, the affinity increases, and the chemical stability of the grease composition can be enhanced. In the grease composition of the present invention, the difference in the SP value between the base oil and the urea-based thickener is preferably 2.0 to 3.5, more preferably 2.1 to 3.4, further preferably 2.2 to 3.3, and most preferably 2.5 to 3.2.

[Molybdenum Dithiophosphate]

As used herein, "molybdenum dithiophosphate" is a compound represented by the following formula (1).

Formula (1):

[Formula 1]

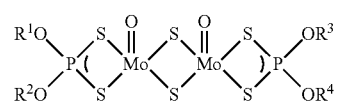

(1)

wherein $R^1$-$R^4$ may be the same or different and are each a hydrocarbon group having 1-30 carbon atoms.

In the grease composition of the present invention, molybdenum dithiophosphate is added in order to maintain for a long period the fatigue life of a member in which the grease composition is sealed. It is considered that molybdenum dithiophosphate more easily forms a phosphoric acid film having high wear resistance on a metal surface than molybdenum dithiocarbamate and contributes to longer life. Molybdenum dithiophosphate is hereinafter sometimes referred to as MoDTP.

The content of molybdenum dithiophosphate in the grease composition of the present invention is preferably 0.05% by mass to 1.5% by mass, more preferably 0.1% by mass to 1.5% by mass, and further preferably 0.5% by mass to 1.2% by mass based on the total amount of the grease composition.

[Barium Sulfonate]

The grease composition of the present invention includes barium sulfonate. In the grease composition of the present invention, barium sulfonate is added in order to maintain for a long period the fatigue life of a member in which the grease composition is sealed. Barium sulfonate is usually used as a rust inhibitor. It is considered that barium sulfonate has a high metal component atomic weight and is heavy compared with calcium sulfonate, and therefore adsorption on a metal surface proceeds easily. Thus, it is considered that the metal contact of a member is prevented, and the effect of improving fatigue life is large.

It is considered that molybdenum dithiophosphate and barium sulfonate exhibit a synergistic effect on a metal surface, and therefore a member in which the grease composition of the present invention is sealed can maintain fatigue life for a long period.

The content of barium sulfonate in the grease composition of the present invention is preferably 0.05% by mass to 1.5% by mass, more preferably 0.1% by mass to 1.5% by mass, and further preferably 0.5% by mass to 1.2% by mass based on the total amount of the grease composition.

[Other Additives]

Examples of additives include various types of additives such as an extreme pressure agent, a rust inhibitor, an antioxidant, a wear prevention agent, a dye, a hue stabilizer, a thickening agent, a structure stabilizer, a metal deactivator, a viscosity index improver, a phosphite, an ether-based compound, and an oxidized paraffin, as optional components. As the extreme pressure agent, a sulfur-based compound (zinc dithiocarbamate (ZnDTC) or the like) or a chlorine-based compound (a chlorinated paraffin or the like) may be used.

Examples of the phosphite include triisopropyl phosphite, diisopropyl phosphite, and diphenyl hydrogen phosphite. Particularly, diphenyl hydrogen phosphite is preferred. The content of the phosphite is preferably 0.2% by mass to 5% by mass, further preferably 0.3% by mass to 4% by mass, based on the total amount of the grease composition.

Examples of the ether-based compound preferably include ether-based compounds having a polar group in the molecule, further preferably ether-based compounds having a polar group at an end of the molecule, and especially preferably ether-based compounds having a polar group including a five-membered ring having at least one heteroatom at an end of the molecule. When the ether-based compound has a polar group, an oiliness film of the ether-based compound can be well formed on a surface film of a phosphorus-based compound. This is because the polar group is attracted to and easily adsorbed on a surface film derived from a phosphite having polarity formed by reaction with a raceway surface (metal surface) of a bearing.

Examples of the ether-based compounds having a polar group including a five-membered ring having at least one heteroatom at an end of the molecule include sulfolane derivatives represented by the following general formula (2).

Formula (2):

[Formula 2]

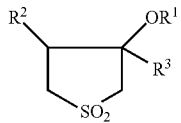

(2)

wherein $R^1$ represents a hydrocarbon group having 6-16 carbon atoms, and $R^2$ and $R^3$ each represent hydrogen or a hydrocarbon group having 1-4 carbon atoms.

The content of the ether-based compound is preferably 0.5% by mass to 3% by mass, further preferably 0.7% by mass to 2% by mass, based on the total amount of the grease composition.

Examples of the oxidized paraffin include those obtained by oxidizing petroleum-based waxes such as paraffin waxes and microcrystalline waxes, and synthetic waxes such as polyethylene waxes. The content of the oxidized paraffin is preferably 0.5% by mass to 10% by mass based on the total amount of the grease composition.

As the metal deactivator, for example, benzotriazole or a derivative thereof, specifically 1,2,3-benzotriazole can be used.

Examples of the antioxidant include phenol-based antioxidants, zinc dithiophosphate-based antioxidants, and phenothiazine-based antioxidants. Specifically, P,P-dioctyldiphenylamine can be used.

Examples of the rust inhibitor include aliphatic amines, metal organosulfonates, metal organophosphates, alkenyl succinates, and polyhydric alcohol esters. Specifically, sorbitan monoisostearate can be used.

As the wear prevention agent, a phosphate, a metal dithiophosphate salt, or the like can be used. For example, diphenyl hydrogen phosphite can be used.

The grease composition of the present invention can be obtained, for example, by mixing and stirring a base oil, a urea-based thickener, molybdenum dithiophosphate, and barium sulfonate as essential components and further other additives as needed and then passing the mixture through a roll mill or the like.

[Chemical Stability]

As used herein, "improve chemical stability" means decreasing the amount of impurities generated when using a grease for a certain period. The amount of impurities generated can be evaluated using a Suzuki type friction tester described in JIS K 7218.

The grease composition of the present invention is suitable for long period use in high temperature and high load conditions and therefore suitable for use for automobile hub units, alternators, constant velocity joints, and the like and particularly suitable for automobile hub units.

An embodiment of the present invention will be described in detail below with reference to the accompanying drawing. FIG. 1 is a cross-sectional view including the central axis of a wheel bearing 1 that is a rolling bearing according to one embodiment of the present invention.

In FIG. 1, this wheel bearing 1 rotatably supports a wheel on the car body of a vehicle such as an automobile. This wheel bearing 1 includes an inner shaft 4, an inner ring 5, an outer ring 3, first tapered rollers 6, second tapered rollers 7, a first seal 8, and a second seal 9. The inner shaft 4 includes an inner shaft body 41 and a wheel mounting flange 42 for wheel mounting extending to the radial outside on the axial wheel side (the left side of FIG. 1, hereinafter referred to as the axial outer side) of the inner shaft body 41.

The inner shaft 4 has the raceway 44 of the inner shaft 4 on the outer peripheral surface 43 of the inner shaft body 41 between the wheel mounting flange 42 and the outer peripheral surface 43 of the inner shaft body 41 fitted with the inner ring 5. The inner ring 5 is fixed by the fitting of an inner peripheral surface 51 to the outer peripheral surface 43 of the inner shaft body 41.

The inner ring 5 has the raceway 52 of the inner ring 5 on the outer peripheral surface 43. The inner shaft 4 and the inner ring 5 constitute an inner raceway member 2. On the inner shaft 4, the inner ring 5 is fitted to the outer peripheral surface 43 of the inner shaft body 41 on the axial car body side (the right side of FIG. 1, hereinafter referred to as the axial inner side).

The outer ring 3 includes an outer ring body 31 and a car body mounting flange 32 for car body mounting on the radial outside of the outer ring body 31. The outer ring 3 has the first raceway 33 of the outer ring 3 on the inner peripheral surface on the axial outer side. The outer ring 3 has the second raceway 34 of the outer ring 3 on the inner peripheral surface on the axial inner side. The outer ring 3 constitutes an outer raceway member 3. The outer ring 3 is disposed on the radial outside of the inner raceway member 2. The car body mounting flange 32 is fixed to a knuckle arm (vehicle body) not shown.

The plurality of first tapered rollers 6 are disposed between the raceway 44 of the inner shaft 4 and the first raceway 33 of the outer ring 3. The plurality of first tapered rollers 6 are rollable on the raceway 44 of the inner shaft 4 and the first raceway 33 of the outer ring 3. The plurality of second tapered rollers 7 are disposed between the raceway 52 of the inner ring 5 and the second raceway 34 of the outer ring 3. The plurality of second tapered rollers 7 are rollable on the raceway 52 of the inner ring 5 and the second raceway 34 of the outer ring 3. The plurality of first tapered rollers 6 and the plurality of second tapered rollers 7 are rolling elements. The inner raceway member 2 is rollable on the outer raceway member 3 by such a structure.

The first seal 8 is mounted at the end of the outer ring body 31 on the axial outer side. The internal space 11 between the inner raceway member 2 and the outer raceway member 3 is hermetically sealed from the external space 12 by the sliding of the lip tip of the first seal 8 on the lip contact surface 45 of the inner shaft 4 or the lip contact surface 45 of a slinger mounted on the inner shaft 4. The second seal 9 is mounted at the end of the outer ring body 31 on the axial inner side. The internal space 11 between the inner raceway member 2 and the outer raceway member 3 is hermetically sealed from the external space 12 by the sliding of the lip tip of the second seal 9 on the lip contact surface 53 of the inner ring 5 or the lip contact surface 53 of a slinger mounted on the inner ring 5.

In this embodiment, the wheel bearing 1 further includes a first retainer 61, a second retainer 62, a pulser ring 63, a sensor 64, and a bolt 65.

The first retainer 61 is formed in a ring shape. The first retainer 61 has pockets retaining the plurality of first tapered rollers 6 respectively. The first retainer 61 retains the plurality of first tapered rollers 6 at circumferential intervals. The second retainer 62 is formed in a ring shape. The second retainer 62 has pockets retaining the plurality of second tapered rollers 7 respectively. The second retainer 62 retains the plurality of second tapered rollers 7 at circumferential intervals.

The pulser ring 63 is ring-shaped. The pulser ring 63 is fixed to the outer peripheral surface 46 of the inner shaft body 41 between the raceway 44 of the inner shaft 4 and the raceway 52 of the inner ring 5 in the axial direction, between the raceway 44 of the inner shaft body 41 and the outer peripheral surface 43 of the inner shaft body 41 fitted with the inner ring 5. The sensor 64 is fixed by being fitted into a through hole 37 passing through the radial outer surface 35 of the outer ring 3 and the inner peripheral surface of the outer ring 3 being the inner peripheral surface 36 between the first raceway 33 and the second raceway 34. The sensor 64 is radially opposed to the pulser ring 63. The sensor 64 detects the rotation speed of the inner raceway member 2 on the outer raceway member 3 by the rotation of the pulser ring 63 on the sensor 64.

The bolt 65 is fitted into a through hole 47 formed in the wheel mounting flange 42, and fixed. The bolt 65 is used for fixing a brake disk and a wheel not shown to the wheel mounting flange 42.

The grease composition of the present invention is disposed in the internal space 11. The grease composition of the present invention is present in the contact places between the first tapered rollers 6 and the raceway 44 of the inner shaft 4, the contact places between the first tapered rollers 6 and the first raceway 33 of the outer ring 3, the contact places between the second tapered rollers 7 and the raceway 52 of the inner ring 5, and the contact places between the second tapered rollers 7 and the second raceway 34 of the outer ring 3. The grease composition of the present invention promotes lubrication at these positions. The grease composition of the present invention is sealed in an amount of 20% by volume to 60% by volume based on space volume obtained by subtracting all the first tapered rollers 6, all the second tapered rollers 7, the first retainer 61, the second retainer 62, the pulser ring 63, and the portion of the sensor 64 protruding into the internal space 11, from the internal space 11 surrounded by the inner raceway member 2, the outer raceway member 3, the first seal 8, and the second seal 9.

EXAMPLES

Next, the present invention will be described based on Examples and Comparative Examples, but the present invention is not limited by the following Examples. % Represents % by mass unless otherwise described.

Examples 1-5 and Comparative Examples 1-6

<Blending of Greases>

For the Examples and the Comparative Examples, a thickener, a base oil, and additives were blended in the blending proportions shown in Tables 2 and 3 to prepare test grease compositions. The evaluation shown below was performed on the obtained test grease compositions. The evaluation results are shown in Tables 2 and 3.

In Tables 2 and 3, the kinematic viscosity of the base oil is a value measured in accordance with JIS K 2283: 2000.
(1) Base Oil
Poly-α-olefin 1, kinematic viscosity 410 mm$^2$/s (40° C.)
Poly-α-olefin 2, kinematic viscosity 31 mm$^2$/s (40° C.)
Poly-α-olefin 3, kinematic viscosity 17.5 mm$^2$/s (40° C.)
Each base oils were mixed at the volume ratios shown in Tables 2 and 3 to prepare base oils.
(2) Thickener
Aliphatic amine (octadecylamine)
Alicyclic amine (cyclohexylamine)
Aromatic amine (p-toluidine)
Amines were mixed at the molar ratios shown in Tables 2 and 3 and reacted with a diisocyanate compound (methylene diisocyanate) to prepare urea-based compounds.
(3) Additives
Additives were added as described in Tables 2 and 3. The details of the additives are as follows.
Methyl ester of oxidized wax, manufactured by The Lubrizol Corporation (product name: ALOX350)
Diphenyl hydrogen phosphite, manufactured by Johoku Chemical Co., Ltd. (product name: JP-260)
Ba-sulfonate, manufactured by King Industries (product name: NA-SUL BSN-HT)
Ca-sulfonate, manufactured by King Industries (product name: NA-SUL CA-1089)
Heterocyclic ether, manufactured by The Lubrizol Corporation (product name: LZ730)
MoDTP, manufactured by ADEKA (product name: ADEKA SAKURA-LUBE 300)
<Evaluation>
(1) Evaluation of Amount of Impurities
The amount of impurities was evaluated using a Suzuki type friction tester described in JIS K 7218. A tapered roller bearing 30204JR to which 1.4 g of a grease was applied was mounted in a Suzuki type friction tester. 10 Cycles were carried out in each of which in a state in which a thrust load of 3000 N was applied, the Suzuki type friction tester was operated at 20 rpm for 1 min and then stopped for 1 min. Then, the bearing was observed and visually checked for the generation of impurities.

(2) Fatigue Life Test

Evaluation was performed using a Unisteel rolling fatigue tester described in IP305. A grease was applied to a 51110 bearing in which the number of balls was decreased to three, and the life was evaluated by the time until abnormal vibration was generated in operation at rotational speed of 1500 rpm and a load of 337.5 kg.

TABLE 2

| Raw material | Unit | Example 1 | Example 2 | Example 3 | Example 4 | Example 5 |
|---|---|---|---|---|---|---|
| Poly-α-olefin 1 | % by volume | — | — | — | — | — |
| Poly-α-olefin 2 | % by volume | 100 | 50 | 100 | 100 | 100 |
| Poly-α-olefin 3 | % by volume | — | 50 | — | — | — |
| Base oil kinematic viscosity (40° C.) | mm2/sec | 31 | 23 | 31 | 31 | 31 |
| Amount of base oil | % by mass | Balance | Balance | Balance | Balance | Balance |
| Aliphatic amine | mol % | 20 | 20 | 10 | 15 | 30 |
| Alicyclic amine | mol % | 80 | 80 | 90 | 85 | 70 |
| Aromatic amine | mol % | — | — | — | — | — |
| Amount of thickener | % by mass | 10 | 11 | 15 | 10 | 12.5 |
| Methyl ester of oxidized wax | % by mass | 2 | 2 | 2 | 2 | 2 |
| Diphenyl hydrogen phosphite | % by mass | 0.5 | 0.5 | 0.5 | 0.5 | 0.5 |
| Ba-sulfonate | % by mass | 1 | 1 | 1 | 1 | 1 |
| Ca-sulfonate | % by mass | — | — | — | — | — |
| Heterocyclic ether | % by mass | 1 | 1 | 1 | 1 | 1 |
| MoDTP | % by mass | 0.9 | 0.9 | 0.9 | 0.9 | 0.9 |
| Other additives | % by mass | 2.55 | 2.55 | 2.55 | 2.55 | 2.55 |
| Total amount of additives | % by mass | 7.95 | 7.95 | 7.95 | 7.95 | 7.95 |
| SP value of base oil | | 8.40 | 8.40 | 8.40 | 8.40 | 8.40 |
| SP value of thickener | | 11.62 | 11.62 | 11.88 | 11.73 | 11.40 |
| Difference between SP values of base oil and thickener | | 3.10 | 3.10 | 3.38 | 3.24 | 2.85 |
| Impurities (Suzuki type friction test) | | Good | Good | Fair | Fair | Good |
| Fatigue life test | Fatigue life (h) | 12.6 | 10.7 | 11.5 | 11.9 | 12.1 |

TABLE 3

| Raw material | Unit | Comparative Example 1 | Comparative Example 2 | Comparative Example 3 | Comparative Example 4 | Comparative Example 5 | Comparative Example 6 |
|---|---|---|---|---|---|---|---|
| Poly-α-olefin 1 | % by volume | — | — | 52 | — | — | — |
| Poly-α-olefin 2 | % by volume | 100 | 100 | 48 | 100 | 100 | 100 |
| Poly-α-olefin 3 | % by volume | — | — | — | — | — | — |
| Base oil kinematic viscosity (40° C.) | mm2/sec | 31 | 31 | 100 | 31 | 31 | 31 |
| Amount of base oil | % by mass | Balance | Balance | Balance | Balance | Balance | Balance |
| Aliphatic amine | mol % | — | — | — | — | 20 | 20 |
| Alicyclic amine | mol % | 80 | 100 | 80 | — | 80 | 80 |
| Aromatic amine | mol % | 20 | — | 20 | 100 | — | — |
| Amount of thickener | % by mass | 17 | 17 | 18 | 16 | 10 | 10 |
| Methyl ester of oxidized wax | % by mass | 2 | 2 | 2 | 2 | 2 | 2 |
| Diphenyl hydrogen phosphite | % by mass | 0.5 | 0.5 | 0.5 | 0.5 | 0.5 | 0.5 |
| Ba-sulfonate | % by mass | 1 | 1 | 1 | 1 | 1 | — |
| Ca-sulfonate | % by mass | — | — | — | — | — | 1.2 |
| Heterocyclic ether | % by mass | 1 | 1 | 1 | 1 | 1 | 1 |
| MoDTP | % by mass | 0.9 | 0.9 | 0.9 | 0.9 | 0 | 0.9 |
| Other additives | % by mass | 2.55 | 2.55 | 2.55 | 2.55 | 2.55 | 2.55 |
| Total amount of additives | % by mass | 7.95 | 7.95 | 7.95 | 7.95 | 7.05 | 8.15 |
| SP value of base oil | | 8.40 | 8.40 | 8.40 | 8.40 | 8.40 | 8.40 |
| SP value of thickener | | 12.06 | 12.12 | 12.12 | 12.34 | 11.62 | 11.62 |
| Difference between SP values of base oil and thickener | | 3.66 | 3.72 | 3.72 | 3.94 | 3.10 | 3.10 |
| Impurities (Suzuki type friction test) | | Poor | Poor | Poor | Poor | Good | Good |
| Fatigue life test | Fatigue life (h) | — | — | — | — | 7.9 | 4.1 |

The "Difference between SP values of base oil and thickener" in Tables 2 and 3 is slightly corrected considering the combination of ureas thought to be probabilistically produced. That is, when two or more amines are used as the thickener, a urea-based compound in which different amine species are respectively added to both arms (NCO—) of a diisocyanate is produced with a certain probability when the amines are reacted with the diisocyanate. For example, when octadecylamine and cyclohexylamine are reacted with methylene diisocyanate, a urea-based compound in which octadecylamine and cyclohexylamine are respectively bonded to both arms of the diisocyanate is produced. Based on this production probability, the SP value of the thickener is slightly corrected to calculate the "Difference between SP values of base oil and thickener". The SP values of the products are shown in Table 4.

TABLE 4

| Amines bonded to both arms of diisocyanate | SP value |
| --- | --- |
| CHA-CHA | 12.06 |
| pTD-pTD | 12.34 |
| ODA-ODA | 9.86 |
| ODA-CHA | 10.6 |
| pTD-CHA | 12.2 |

For example, in Example 1, the "Difference between SP values of base oil and thickener" is calculated as follows.

$12.06*(0.8*0.8)+9.86*(0.2*0.2)+10.6*(0.8*0.2)*2=11.50$ $11.50-8.40=3.10$

For example, in Example 5, the "Difference between SP values of base oil and thickener" is calculated as follows.

$12.06*(0.7*0.7)+9.86*(0.3*0.3)+10.6*(0.7*0.3)*2=11.25$ $11.25-8.40=2.85$

In the respective Suzuki type friction tests in which the grease compositions of Examples 1, 2, and 5 were used, the generation of impurities was not noted, and the results were good. In the respective Suzuki type friction tests in which the grease compositions of Examples 3 and 4 were used, an extremely small amount of impurities were generated, but it was evaluated as fair, thus this was in a range in which the grease composition withstood practical use.

In each of Comparative Example 1-Comparative Example 4 in which the difference between the SP values of the base oil and the thickener exceeded 3.5, impurities were generated. When these impurities were generated, the generation of an abnormal sound was noted. Therefore, it was evaluated as poor, thus use as a grease was evaluated as impossible, and evaluation regarding fatigue life was not performed.

In Comparative Example 5 in which molybdenum dithiophosphate was not included, the generation of impurities was not noted. However, in Comparative Example 5, the fatigue life was shorter than in Example 1 in the fatigue life test.

In Comparative Example 6 in which calcium sulfonate rather than barium sulfonate was included, the generation of impurities was not noted. However, in the fatigue life test, the fatigue life was shorter than in Example 1.

INDUSTRIAL APPLICABILITY

The grease composition of the present invention can be applied to the lubrication of various types of joints, gears, bearings, gear wheels, and the like having sliding portions of metals because the generation of impurities can be suppressed. The rolling bearing of the present invention has long fatigue life and therefore can be used for automobile rolling bearings including the wheel bearings of automobiles, and various types of industrial equipment rolling bearings.

REFERENCE SIGNS LIST 1 wheel bearing
2 inner raceway member
3 outer ring, outer raceway member
4 inner shaft
5 inner ring
6 first tapered roller
7 second tapered roller
8 first seal
9 second seal
11 internal space
12 external space
31 outer ring body
32 car body mounting flange
33 first raceway of outer ring 3
34 second raceway of outer ring 3
35 radial outer surface of outer ring 3
36 inner peripheral surface between first raceway 33 and second raceway 34
37 through hole passing through inner peripheral surface 36
41 inner shaft body
42 wheel mounting flange
43 outer peripheral surface of inner shaft body 41 on axial car body side
44 raceway of inner shaft 4
45 lip contact surface of inner shaft 4 or lip contact surface of slinger mounted on inner shaft 4
46 outer peripheral surface of inner shaft body 41 between raceway 44 of inner shaft 4 and raceway 52 of inner ring 5 in axial direction
47 through hole formed in wheel mounting flange 42
51 inner peripheral surface of inner ring 5
52 raceway of inner ring 5
53 lip contact surface of inner ring 5 or lip contact surface of slinger mounted on inner ring 5
61 first retainer
62 second retainer
63 pulser ring
64 sensor
65 bolt

The invention claimed is:

1. A grease composition comprising:
a poly-α-olefin;
a urea-based thickener;
molybdenum dithiophosphate; and
barium sulfonate, wherein
a difference between an SP value of the urea-based thickener and an SP value of the poly-α-olefin is 3.5 or less,
wherein the urea-based thickener is a urea-based thickener in which a ratio of an amount of an aliphatic amine to a total amount of an alicyclic amine and the aliphatic amine {amount of aliphatic amine:(total amount of alicyclic amine and aliphatic amine)} is 18:100 to 35:100 in molar ratio,
wherein the alicyclic amine is selected from the group consisting of cyclohexylamine and dicyclohexylamine,
wherein the aliphatic amine is octadecylamine, wherein a kinematic viscosity of the poly-α-olefin at 40° C. is 20 mm²/s to 40 mm²/s, wherein a content of the poly-α-olefin is 75% by mass to 85% by mass based on the grease composition, a content of the urea-based thickener is 8% by mass to 20% by mass based on the grease composition, a content of the molybdenum dithiophosphate is 0.05% by mass to 1.5% by mass based on the grease composition, and wherein a content of the barium sulfonate is 0.05% by mass to 1.5% by mass based on the grease composition.

2. A rolling bearing comprising:

an inner raceway member;

an outer raceway member;

a plurality of rolling elements rollably disposed between a raceway of the inner raceway member and a raceway of the outer raceway member;

two seals hermetically sealing an internal space between the inner raceway member and the outer raceway member against an external space; and the grease composition according to claim 1 sealed in the internal space.

\* \* \* \* \*